(No Model.) 2 Sheets—Sheet 1.

J. W. HAYES, Jr.
WAGON BOX LIFTER.

No. 530,770. Patented Dec. 11, 1894.

Witnesses:
A. A. Blankenmeister
M. P. Smith

Inventor:
John W. Hayes Jr.
by Higdon & Higdon and Longan
Attys.

(No Model.) 2 Sheets—Sheet 2.

J. W. HAYES, Jr.
WAGON BOX LIFTER.

No. 530,770. Patented Dec. 11, 1894.

Witnesses:

Inventor:
John W. Hayes Jr.
by Higdon and Higdon & Longan
Attys.

UNITED STATES PATENT OFFICE.

JOHN W. HAYES, JR., OF CHESTER, ILLINOIS.

WAGON-BOX LIFTER.

SPECIFICATION forming part of Letters Patent No. 530,770, dated December 11, 1894.

Application filed June 25, 1894. Serial No. 515,580. (No model.)

*To all whom it may concern:*

Be it known that I, JOHN W. HAYES, Jr., of the city of Chester, Randolph county, State of Illinois, have invented certain new and useful Improvements in Wagon-Box Lifters, of which the following is a full, clear, and exact description, reference being had to the accompanying drawings, forming a part hereof.

The object of my invention is to construct an improved wagon box lifter, one that possesses superior advantages in point of simplicity, durability and general efficiency.

My invention consists in certain novel features of construction, combination and arrangement of parts, hereinafter specified and claimed.

Figure 1:
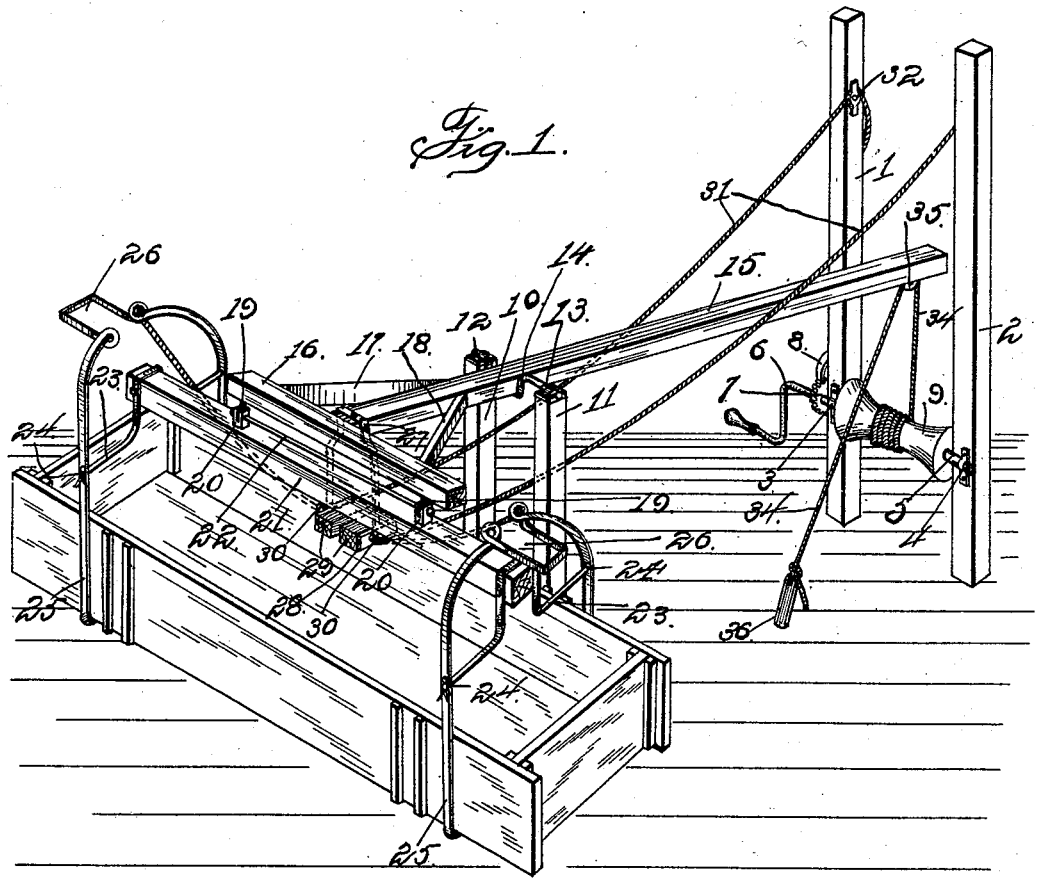
Figure 4:
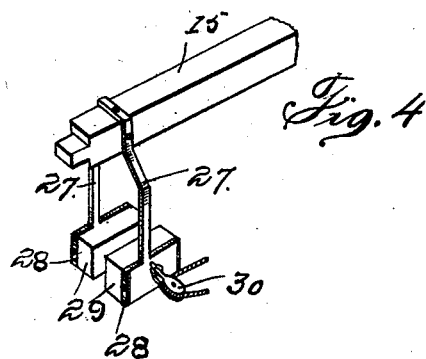
Figure 2:
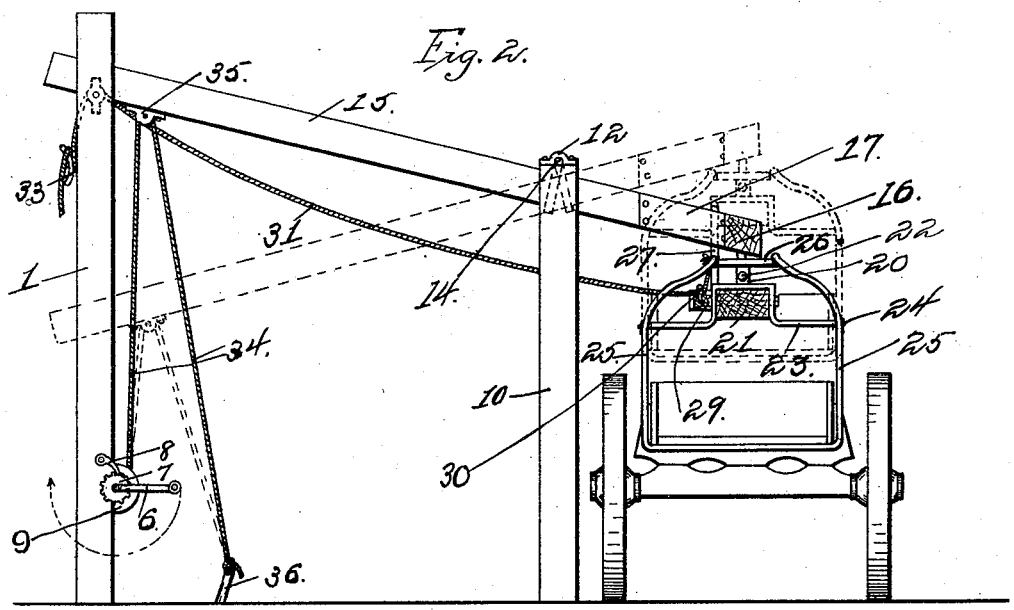
Figure 3:
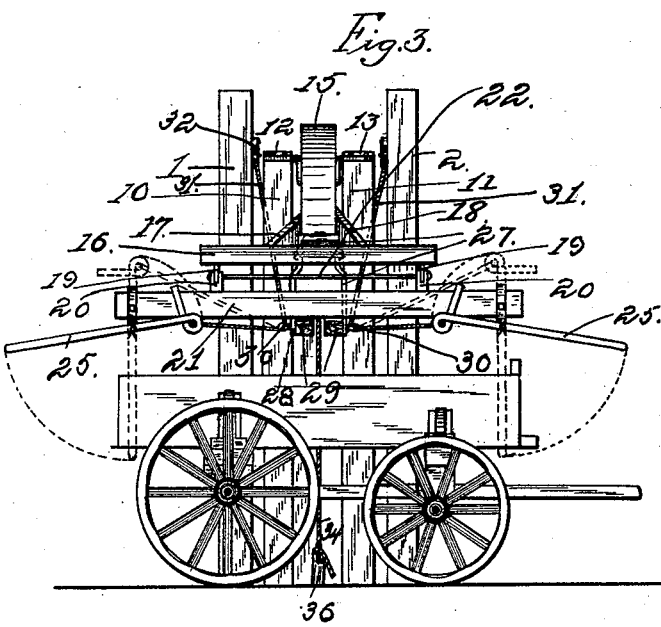

Referring to the drawings: Figure 1 is a perspective view of my improved wagon box lifter in position as required for practical use, and also showing the wagon box engaged by the lifter and in a raised position. Fig. 2 is a side elevation of my improved lifter showing the position of the wagon and box relative to said lifter, dotted lines in this figure showing the position of the lever and various parts when the box is lifted. Fig. 3 is a front elevation of my improved lifter, showing the position of the various parts just before the loops engage around the ends of the wagon box. Fig. 4 is a detail perspective view of a strap that is bolted near the forward end of the lifting lever and carrying a pair of blocks, to which are secured pulleys on which ropes or cables are adapted to engage.

Referring by numerals to the accompanying drawings, 1 and 2 indicate upright posts, the same being held in their positions in any desired manner. Mounted in journal bearings 3 and 4 is a shaft 5 which passes beyond the journal bearing 3, and is formed into a crank-handle 6. On this shaft 5 just outside the upright 1 is a ratchet-wheel 7, with which a gravity pawl 8 is adapted to engage.

Between the uprights 1 and 2 and on the shaft 5 is rigidly mounted a drum or sheave 9.

Directly in front of the uprights 1 and 2, and vertically positioned in any suitable manner are upright posts 10 and 11. Bearings 12 and 13 are bolted to the tops of these uprights 10 and 11, and are adapted to receive the ends of a bent shaft 14. This shaft 14 is fixed to, and serves as a fulcrum for, the lifting lever 15, the long arm of said lifting lever extending rearwardly and between the upright posts 1 and 2. The short arm of this lifting lever 15 passes forward a short distance and has rigidly bolted or mounted thereon the laterally positioned timber 16.

Braces 17 and 18 serve to more substantially hold together the lifting lever and the laterally positioned timber. Hook eyes 19 depend from the under side of this cross timber 16 and are adapted to pass between bifurcated clips 20 rigidly secured to a cross-timber 21, said cross-timber 21 being similar in size to the cross-timber 16, but of a greater length. A rod 22 passing through the apertures in the hook eyes 19 and the bifurcated clips 20 serves to hold the cross-timbers 16 and 21 together, and also provides a swinging or hinge connection between said cross-timbers.

Firmly bolted to the ends of the cross-timber 21 and engaging against the top and two sides of said timber, are bars or straps 23. From the sides of the timber 21 these straps depend a short distance, are then bent into a horizontal plane, and the ends formed into journals 24.

Suitable bars or straps are bent into rectangular loops 25, said loops being of a width sufficient to engage an ordinary wagon box. The upper portions of these loops are mounted on journals 24; from thence are bent upwardly and inwardly, and into the horizontal rectangular loops 26, said loops 26 being of such size as to work free of the ends of the cross-timber 21.

Adjacent the cross-timber 16, bolted to the lifting lever 15 and depending therefrom, is a strap 27, the ends 28 of which pass around the outer corners of rectangular wooden blocks 29. To the outer faces of said blocks 29 are firmly secured ordinary pulleys 30. Passing around these pulleys 30, and secured to the loops 26, are ropes or cables 31. From the pulleys these ropes or cables extend forward between the uprights 10 and 11 on each side of the lifting lever 15, over pulleys 32 secured to the inside faces of the uprights 1 and 2, from thence downwardly and are adapted to be wound around cleats 33.

A rope or cable 34 is secured to the drum or sheave 9, adapted to be wound thereon, passes upward over a pulley 35 secured to the lower face of the rear end of the lifting lever, from thence downwardly to be secured to a pin 36.

The operation is as follows: When it is desired to lift a wagon box, the forward end of the lifting lever carrying the cross-timbers and loops must necessarily be in an elevated position. The wagon is now positioned immediately in front of the upright posts 10 and 11 and below the cross-timbers 16 and 21. By releasing the gravity pawl 8 from the ratchet-wheel 7, the drum or sheave 9 will rotate and the rope 34 unwind therefrom. This allows the rear end of the lifting lever 15 to raise, and the forward end carrying the cross-timbers to lower. The loops 25 having previously been raised by the manipulation of the ropes 31 to the position shown in solid lines in Fig. 3, are now allowed, by the releasing of the ends of the ropes 31 from the cleats 33, to swing downwardly, as shown by dotted lines in Fig. 3, and to surround and engage against the ends of the wagon box. By now rotating the drum 9, the rope 34 winding thereon will necessarily pull down the rear arm of the lever 15, thereby raising the forward end of the wagon box. Thus it will assume the position shown by dotted lines in Fig. 2.

When it is desired to re-position the wagon box upon the wagon bed, the gravity pawl 8 is disengaged from the ratchet-wheel 7 and the box allowed to lower. By now exerting a rearward pull on the ropes 31, the loops 25 will swing outwardly and upwardly, being pivoted on the journals 24 thereby disengaging said loops from the ends of the wagon box. The loop 26 allows the upper ends of the loops 25 to be thrown into a practically horizontal plane and out of the way when not in use.

Thus it will be seen how I have provided a wagon box lifter that is easily constructed and operated, of minimum cost, and efficient in operation.

What I claim is—

1. The improved wagon-box lifter, comprising a pivoted beam or lever 15, a drum or sheave and a rope for depressing one end of said lever, a cross-timber 16 fixed upon the opposite end of said lever, an additional cross-timber 21 suspended parallel with and from the under side of said cross-timber 16 but having a length in excess of the latter, bars or straps 23 secured to the outer ends of said cross-timber 21 and having journals 24 at their outer ends, loops 25 having a width sufficient to embrace an ordinary wagon-box and mounted intermediate of their lengths on said journals 24, horizontal rectangular loops 26 secured at the upper ends of said loops 25 and bent so as to engage over the said cross-timber 21 when the upper ends of said loops 25 are drawn inward and downward, a strap 27 suspended from the said lever 15 adjacent said cross-timbers and extending downward to a point in a plane below said timbers, blocks 29 secured to the lower portion of said strap 27, pulleys 30 mounted upon said blocks, and suitable ropes 31 secured to the loops 26 and passing around said pulleys and extending to a stationary object, one on each side of said lever 15, substantially as herein specified.

2. A wagon box lifter, comprising a pair of upright posts, a drum or sheave operating between said posts, a second pair of upright posts located directly in front of the first mentioned pair of posts, a beam forming a lever fulcrumed on a shaft engaging in bearings on the top of the second pair of uprights, a cross-timber secured to the forward end of the lifting lever, a cross-timber hinged loosely to and beneath the first said cross-timber, rectangular loops swung from bars on the ends of the lower or swinging timber, ropes or cables connected to said loops at a point above the pivotal-point of the latter, and passing over pulleys and blocks to the first pair of upright posts, and a rope or cable, one end of which is secured to a stationary object and passing over a pulley secured to the rear end of the lifting lever and from thence over the drum or sheave, all substantially as shown and described.

In testimony whereof I affix my signature in presence of two witnesses.

JOHN W. HAYES, JR.

Witnesses:
C. K. JONES,
E. E. LONGAN.